(12) United States Patent
Ishikawa et al.

(10) Patent No.: US 7,077,352 B2
(45) Date of Patent: Jul. 18, 2006

(54) MAGNETIC TAPE CARTRIDGE

(75) Inventors: Kenji Ishikawa, Kanagawa-ken (JP); Hidetoshi Yamamoto, Kanagawa-ken (JP); Kiyoo Morita, Kanagawa-ken (JP); Akihiro Hashimoto, Kanagawa-ken (JP); Daisuke Takahashi, Kanagawa-ken (JP); Hideaki Shiga, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 38 days.

(21) Appl. No.: 10/953,446

(22) Filed: Sep. 30, 2004

(65) Prior Publication Data

US 2005/0127223 A1    Jun. 16, 2005

Related U.S. Application Data

(62) Division of application No. 10/019,678, filed as application No. PCT/JP00/04480 on Jul. 6, 2000, now Pat. No. 6,896,217.

(30) Foreign Application Priority Data

Jul. 9, 1999   (JP) ................................. 11-195857
Oct. 12, 1999  (JP) ................................. 11-289078

(51) Int. Cl.
*G11B 23/107* (2006.01)

(52) U.S. Cl. ............................... 242/338.1; 242/345.2; 242/348; 360/132

(58) Field of Classification Search ................ 242/338, 242/338.1, 340, 342, 343, 343.1, 343.2, 345.2, 242/348; 360/132
See application file for complete search history.

(56) References Cited

U.S. PATENT DOCUMENTS

| 4,047,232 A |     | 9/1977  | Hisagen et al.           |
|-------------|-----|---------|--------------------------|
| 4,275,108 A |     | 6/1981  | Yamaguchi et al.         |
| 4,532,172 A |     | 7/1985  | Fujiyama                 |
| 4,723,731 A |  *  | 2/1988  | Posso ............ 242/338.1 |
| 5,845,860 A |     | 12/1998 | Tohjo et al.             |
| 5,893,527 A |  *  | 4/1999  | Mizutani et al. ....... 242/348 |
| 5,901,916 A |     | 5/1999  | McAllister et al.        |
| 6,014,293 A |     | 1/2000  | Casey et al.             |
| 6,135,379 A |     | 10/2000 | Argumedo                 |
| 6,264,126 B1|     | 7/2001  | Shima et al.             |

(Continued)

FOREIGN PATENT DOCUMENTS

CN          1116354 A        2/1996

(Continued)

*Primary Examiner*—William A. Rivera
(74) *Attorney, Agent, or Firm*—Sughrue Mion, PLLC

(57) ABSTRACT

A magnetic tape cartridge with an improved reel-rotation restraining mechanism is disclosed. The reel-rotation restraining mechanism has a reel locking member, which is movable toward and away from the reel, for restricting rotation thereof; an urging member for urging the reel locking member in a restraining direction; and an releasing member, which is rotatable integrally with the reel, for moving the reel locking member in an unlocking direction by moving according to a chucking operation of a rotation drive mechanism of a drive unit. The releasing member has three leg portions on the vertexes of a triangular plate portion insertable into through holes in the reel. The releasing member is sized so that with part of the releasing member inserted into a center opening of the reel, and two of the three leg portions positioned near the through holes, the remaining one leg portion can be dropped and inserted within the center opening.

8 Claims, 7 Drawing Sheets

U.S. PATENT DOCUMENTS

| | | |
|---|---|---|
| 6,411,466 B1 | 6/2002 | Shima et al. |
| 6,452,748 B1 | 9/2002 | Shima et al. |
| 6,462,905 B1 | 10/2002 | Takahashi et al. |
| 6,499,686 B1 | 12/2002 | Tsuyuki et al. |
| 6,563,671 B1 | 5/2003 | Morita et al. |
| 6,568,619 B1 | 5/2003 | Shiga et al. |
| 6,581,866 B1 | 6/2003 | Tsuyuki et al. |

FOREIGN PATENT DOCUMENTS

| | | |
|---|---|---|
| EP | 0 926 676 A | 6/1999 |
| EP | 1 098 321 A | 5/2001 |
| JP | 5314452 A | 11/1993 |
| JP | 863940 A | 3/1996 |

* cited by examiner

MAGNETIC TAPE CARTRIDGE

This is a divisional of application Ser. No. 10/019,678 filed Jan. 4, 2002 now U.S. Pat. No. 6,896,217, which is a National Stage application under 35 U.S.C. § 371 of PCT/JP00/04480 filed on Jul. 6, 2000, the disclosure of which is incorporated herein by reference.

TECHNICAL FIELD

The present invention relates to a magnetic tape cartridge and more particularly relates to the structure of reel-rotation restraining means which causes the reel to be in a rotation-locked state when not being used, and the leader tape joined to the leading end of the magnetic tape, in a magnetic tape cartridge where a single reel with magnetic tape wound thereon is rotatably housed within a cartridge case.

BACKGROUND ART

In magnetic tape cartridges, which are being used as storage media that are employed in external storage units for computers, etc., there is known a type where a single reel with magnetic tape wound thereon is rotatably housed within a cartridge case. This magnetic tape is employed to archive data for computers, etc., and stores important information. For this reason, reel-rotation restraining means for restricting rotation of the reel is installed so that problems, such as tape jamming, etc., do not occur and that the magnetic tape is not pulled out of the cartridge case inadvertently when not being used, such as when being stored, etc.

The reel-rotation restraining means is equipped with a reel locking member for restricting rotation of the reel by engaging part of the reel. When the tape cartridge is loaded into a drive unit of an external storage unit, etc., the reel locking member of the reel is unlocked according to the reel chucking operation of the rotation means of the drive unit.

Due to the need for enhanced reliability enhancement in operation of the reel-rotation restraining means, as well as for prevention of the entry of dust into the cartridge case, etc., the reel-rotation restraining means can be separated into a reel locking member for restricting rotation of the reel, an urging member for urging the reel locking member in a locking direction, and an releasing member for moving the reel locking member in an unlocking direction by moving according to the reel chucking operation of the rotation means of the drive unit.

That is, in the inoperative state of the magnetic tape cartridge, the reel is restricted by the reel locking member so that it does rotate unexpectedly. In this manner, the magnetic tape is not pulled out of the magnetic tape cartridge. If the magnetic tape cartridge is loaded into a drive unit, and the reel is chucked by the rotation means of the drive unit, the releasing member is moved and unlocks the reel locking member. In this state, the reel is rotatable and the magnetic tape can be pulled out or rewound.

However, the aforementioned mechanism has the problem that assembly of the releasing member with respect to the reel is troublesome and therefore operability will be reduced. Particularly, providing three leg portions in the releasing member so that the lower ends thereof are inserted through the through holes provided in the reel and the tips thereof are made to abut part of the rotation means of the drive unit, so that they are pushed up and unlock the releasing member by the chucking operation of said rotation means of the drive unit, are advantageous in achieving structural simplification. This structure, however, has the problem that the assembly, which involves inserting the releasing member into the center opening of the reel and then inserting the leg portions into the through holes, cannot be easily performed.

More specifically, in the case where the size of the center opening in the reel is smaller than that of a portion of the cartridge case in which the releasing member is housed, and the releasing member cannot be assembled in a horizontal posture, the assembly operation becomes complicated and troublesome and the operation of forcibly pushing the releasing member is required.

In addition, in the case where the releasing member is assembled by a robot, etc., it is necessary to accurately position and hold the releasing member.

When magnetic tape is forwarded or rewound, the releasing member rotates integrally with the reel at high speeds, but the reel locking member does not rotate. The sliding portions of the two members slide against each other and the temperatures of the sliding portions rise due to frictional heat. Thus, the aforementioned structure has the problem that it is disadvantageous in durability.

The present invention has been made in view of the points mentioned above. Accordingly, it is a first object of the present invention to provide a magnetic tape cartridge where the operation of assembling the releasing member of the reel-rotation restraining means with respect to the reel has been improved.

In magnetic tape cartridges, which are being used as storage media that are employed in external storage units for computers, etc., there is known a type where a single reel with magnetic tape wound thereon is rotatably housed within a cartridge case. This magnetic tape is employed to archive data for computers, etc. Since important information has been stored, the magnetic tape cartridge is constructed so that problems, such as tape jamming, etc., do not occur and that the magnetic tape is not pulled out of the cartridge unexpectedly.

In addition, to pull out the magnetic tape, a leader member such as a leader pin, a leader block, etc., is firmly attached to the leading end portion of the magnetic tape, or a relatively hard plastic leader tape with an engagement bore at the leading end is joined to the leading end portion of the magnetic tape. On the other hand, a drive unit is constructed so that loading or unloading (pulling-out or rewinding) of the magnetic tape is performed by holding and pulling out the leader member or the leading end of the leader tape with a holding member provided in the recording-reproducing unit.

However, when performing the load and unload operations by pulling out the magnetic tape to the magnetic recording-reproducing unit and then winding the leading end on the machine reel of the magnetic recording-reproducing unit, the leading end portion is contacted with tape guides, a magnetic head, etc., and is pulled without being positioned accurately. Because of this, since the leading end portion is easily damaged, it is preferable to reinforce the leading end portion. Leader tape whose strength is higher than that of the magnetic tape can be joined to the leading end of the magnetic tape.

A material that is used as the leader tape is generally a plastic tape which is thicker than magnetic tape. However, the plastic material is easily charged with static electricity by friction, etc., and therefore there is a fear that the magnetic head will be damaged by this static electricity. Particularly, the newer magnetic heads for magnetic recording and reproduction are likely to be damaged by static electricity, because high-sensitivity magnetic heads such as an MR head, etc., are used to obtain high recording density.

In addition, to increase the recording quantity per unit volume of the magnetic tape, recording density is enhanced and there is a tendency to use thin tape. Because of this, tape strength is reduced, the tape edge is likely to be damaged by contact with the flange portions of tape guides during load and unload operations, and there is a fear that tape will be cut by repeated use. Furthermore, there is a fear that the first part of the magnetic tape to be wound on the machine reel of the magnetic recording-reproducing unit will also be damaged when bent and that the strength of that part will be reduced.

On the other hand, in the case where a leader member such as a leader pin, etc., is joined directly to the leading end of magnetic tape to pull out the magnetic tape, the surface roughness will become small, if the magnetic tape is reduced in thickness to meet the high-density requirement, as previously stated. Because of this, the tape surface becomes flat and smooth, the friction coefficient becomes low, and it is difficult to obtain sufficient clamping force between the magnetic tape and the leader member. Thus, there is a fear that the clamping force will be reduced and therefore the leader member will be disengaged from the magnetic tape. Furthermore, in the case where addition of a lubricant to the magnetic layer of the magnetic tape, or application of a lubricant to the tape surface, has been performed to reduce friction between the magnetic tape and the magnetic head, there are cases where the clamping force between the magnetic tape and the clamp member is reduced. In the case where, in view of the points mentioned above, a leader tape is joined to the leading end of the magnetic tape to assure strength, a stepped portion corresponding to a difference in thickness between them occurs in the joint portion between the magnetic tape and the leader tape. If the magnetic tape is successively wound on the stepped portion when wound on the machine reel, a deformation of the magnetic tape called "tape transfer" will occur along the shape of the stepped portion and the contacted state of the magnetic tape with respect to the magnetic head will change. This causes a dropout phenomenon in which suitable writing and reading of data cannot be performed, and results in defects in magnetic recording quality. Generally, magnetic recording is not performed at the tape end region where the aforementioned tape transfer tends to occur. However, if this region is long, recording capacity will be reduced.

The present invention has been made in view of the points mentioned above. Accordingly, it is a second object of the present invention to provide a magnetic tape cartridge that is equipped with a leader tape having characteristics which are satisfactory in strength and other points, to assure reliability.

DISCLOSURE OF THE INVENTION

To achieve the first object of the present invention mentioned above, there is provided a first magnetic tape cartridge comprising:

a single reel with magnetic tape wound thereon;

a cartridge case in which the reel is rotatably housed; and reel-rotation restraining means which allows rotation of the reel during use and restricts the rotation during nonuse;

wherein the reel-rotation restraining means has a reel locking member, which is movable toward and away from the reel, for restricting rotation of the reel, an urging member for urging the reel locking member in a restraining direction, and an releasing member, which is rotatable integrally with the reel, for moving the reel locking member in an unlocking direction by moving according to a chucking operation of rotation means provided in a drive unit;

and wherein the releasing member has a generally triangular plate portion, and three leg portions, provided on vertexes of the triangular plate portion, and having a lower end which is inserted into a through hole provided in the reel and abuts part of the rotation means of the drive unit;

and wherein the releasing member is sized so that with part of the releasing member inserted into a center opening of the reel, and two of the three leg portions positioned near the through holes, the remaining one leg portion is capable of being dropped and inserted within the center opening of the reel.

In the first magnetic tape cartridge of the present invention, it is desirable that the triangular plate portion of the releasing member have a holding portion so that it can be positioned and held by an assembling tool. It is also desirable that the holding portion be constructed of a bore penetrating the plate portion of the releasing member and that the bore be formed obliquely toward a sliding portion of the releasing member that contacts the retraining member.

The first magnetic tape cartridge of the present invention further comprises leader tape firmly attached at one end thereof to a leading end of the magnetic tape; a leader member, firmly attached to the other end of the leader tape, for pulling out the magnetic tape to a magnetic recording-reproducing unit; and reinforcement tape stuck near an end of the leader tape to which the leader member is firmly attached. At least one side of the leader tape has a center-line average surface roughness (Ra) of 4 nm or greater.

In the first magnetic tape cartridge, the leader tape has a base material having a lengthwise elastic modulus of 630 kg/mm$_2$ or less and a widthwise elastic modulus of 580 kg/mm$^2$ or less, preferably a lengthwise elastic modulus of 550 kg/mm$^2$ or less and a widthwise elastic modulus of 550 kg/mm$^2$ or less.

In the first magnetic tape cartridge, the base material of the leader tape is formed from polyethylene terephthalate (PET) film or polyimide (PI) film.

In the first magnetic tape cartridge, the thickness of the leader tape is less than or equal to five times the thickness of the magnetic tape, preferably less than or equal to three times, and further preferably less than or equal to two times.

In the first magnetic tape cartridge, the leader tape has a length greater than or equal to the sum total of a length of a tape running path leading from an opening formed in the cartridge case to a machine reel in the magnetic recording-reproducing unit, and a length of the leader tape wound at least three times on the machine reel.

The first magnetic tape cartridge of the present invention has the following advantages:

When the three leg portions provided in the vertices of the generally triangular plate portion of the releasing member are inserted into the through holes provided in the reel, part of the releasing member is obliquely inserted into the center opening of the reel, and the two leg portions are positioned near the through holes. Then, in this state, the remaining one leg portion is dropped and inserted within the center opening of the reel. Therefore, the reel and the releasing member can be easily assembled without requiring a pushing-in operation, and the magnetic tape cartridge can be efficiently assembled as a whole.

In addition, if the triangular plate portion of the releasing member has a holding portion so that it can be positioned and held by an assembling tool, the releasing member can be easily held with a high degree of accuracy and the aforementioned assembling can be reliably performed.

Furthermore, if the holding portion is constructed of a bore penetrating the plate portion of the releasing member, and the bore is formed obliquely toward a sliding portion of the releasing member that contacts the retraining member, air will flow toward the sliding portion during rotation of the reel and cool the sliding portion and therefore durability can be improved. Thus, the first object of the present invention mentioned above is achieved.

To achieve the second object of the present invention mentioned above, there is provided a second magnetic tape cartridge comprising:

a cartridge case in which a single reel with magnetic tape wound thereon is rotatably housed; and leader tape joined to a leading end of the magnetic tape so that it is pulled out to a magnetic recording-reproducing unit, along with the magnetic tape;

wherein at least one surface of the leader tape is provided with a magnetic layer having a specific surface resistance of $1 \times 10^{13}$ $\Omega/2.54$ $cm^2$ or less.

In addition, there is provided a third magnetic tape cartridge comprising:

a cartridge case in which a single reel with magnetic tape wound thereon is rotatably housed; and leader tape joined to a leading end of the magnetic tape so that it is pulled out to a magnetic recording-reproducing unit, along with the magnetic tape;

wherein the leader tape is constructed of sheet-form metal tape having a specific surface resistance of $1 \times 10^{13}$ $\Omega/2.54$ $cm^2$ or less.

It is preferable that the specific surface resistance be $1 \times 10^{12}$ $\Omega/2.54$ $cm^2$ or less and further preferable that it be $1 \times 10^{11}$ $\Omega/2.54$ $cm^2$ or less. Also, the leader tape may also be constructed of aluminized tape or conductive resin tape.

Furthermore, there is provided a fourth magnetic tape cartridge comprising:

a cartridge case in which a single reel with magnetic tape wound thereon is rotatably housed;

leader tape firmly attached at one end thereof to a leading end of the magnetic tape; and a leader member, firmly attached to the other end of the leader tape, for pulled out the magnetic tape to a magnetic recording-reproducing unit.

In the second, third, and fourth magnetic tape cartridges, at least one side of the leader tape has a center-line average surface roughness (Ra) of 4 nm or greater. It is preferable that the center-line average surface roughness be 8 nm or greater and further preferable that it be 12 nm or greater. Furthermore, it is desirable that reinforcement tape be adhesively attached near an end of the leader tape to which the leader member is firmly attached.

In the second magnetic tape cartridge, it is preferable that the base material of the leader tape have a lengthwise elastic modulus of 630 kg/mm$^2$ or less and a widthwise elastic modulus of 580 kg/mm$^2$ or less. It is further preferable that it have a lengthwise elastic modulus of 550 kg/mm$^2$ or less and a widthwise elastic modulus of 550 kg/mm$^2$ or less.

In the second magnetic tape cartridge, it is preferable that the base material of the leader tape employ polyethylene terephthalate (PET) film or polyimide (PI) film.

In the third magnetic tape cartridge, the thickness of the leader tape is less than or equal to five times the thickness of the magnetic tape, preferably less than or equal to three times, and further preferably less than or equal to two times.

In the second, third, and fourth magnetic tape cartridges, it is desirable that the leader tape have a length greater than or equal to the sum total of a length of a tape running path leading from an opening formed in the cartridge case to a machine reel in the magnetic recording-reproducing unit, and a length of the leader tape wound at least three times on the machine reel.

The second, third, and fourth magnetic tape cartridges of the present invention have the following advantages:

The leader tape joined to the leading end of the magnetic tape has a magnetic layer on at least one surface thereof, or the leader tape is constructed of metal tape. The specific surface resistance is $1 \times 10^{13}$ $\Omega/2.54$ $cm^2$ or less. Therefore, since the specific surface resistance is reduced, it is prevented from being charged with electricity. As a result, damage to the magnetic head by static electricity is prevented and reliability can be enhanced. In addition, since the magnetic tape is joined to the leader tape which is higher in strength than the magnetic tape, durability is enhanced with respect to load and unload operations that are repeatedly performed by a magnetic recording-reproducing unit.

According to the fourth magnetic tape cartridge, one end of the leader tape is firmly attached to the leading end of the magnetic tape, and the leader member is firmly attached to the other end of the leader tape. Therefore, even when the leader member is attached to thin magnetic tape whose friction coefficient is low, the problem of the disengagement of the leader member due to insufficient clamping force can be eliminated. Thus, firm attachment of the leader member can be satisfactorily performed and reliability of load and unload operations is enhanced. Particularly, when the centerline average surface roughness (Ra) of the leader tape is 4 nm or greater, high clamping force is obtained between the leader tape and the leader member. Furthermore, if reinforcement tape is stuck on an end portion of the leader tape to which the leader member is firmly attached, the clamping force becomes higher and resistance to bending strength can also be enhanced.

If the base material of the leader tape has a lengthwise elastic modulus of 630 kg/mm$^2$ or less and a widthwise elastic modulus of 580 kg/mm$^2$ or less, the leader tape has excellent tear strength. Therefore, even if the tape edge contacts with the flange portion of a tape guide during load and unload operations, it will not be damaged and can be repeatedly used without being cut. The strength of the first part of tape which is wound on the machine reel of a magnetic recording-reproducing unit is increased, so there is no fear that the strength of that portion will be reduced. Even if the thickness of magnetic tape is made thin to increase recording capacity, reliability in the durability and recording characteristics can be assured.

Also, if the thickness of the leader tape joined to the leading end of magnetic tape is less than or equal to five times the thickness of the magnetic tape, a stepped portion in the joint portion between them becomes small. Therefore, the tape transfer onto the stepped portion due to deformation caused by winding of the magnetic tape can be reduced; a tape end region, which has a possibility of dropout and in which no magnetic recording is performed, can be made shorter; reliability of magnetic recording quality can be enhanced; and recording capacity can be increased. In this way, the second object of the present invention mentioned above is achieved.

BRIEF DESCRIPTION OF THE DRAWINGS

The present invention will be described in further detail with reference to the accompanying drawings wherein.

BEST MODE FOR CARRYING OUT THE INVENTION

Figure 1:
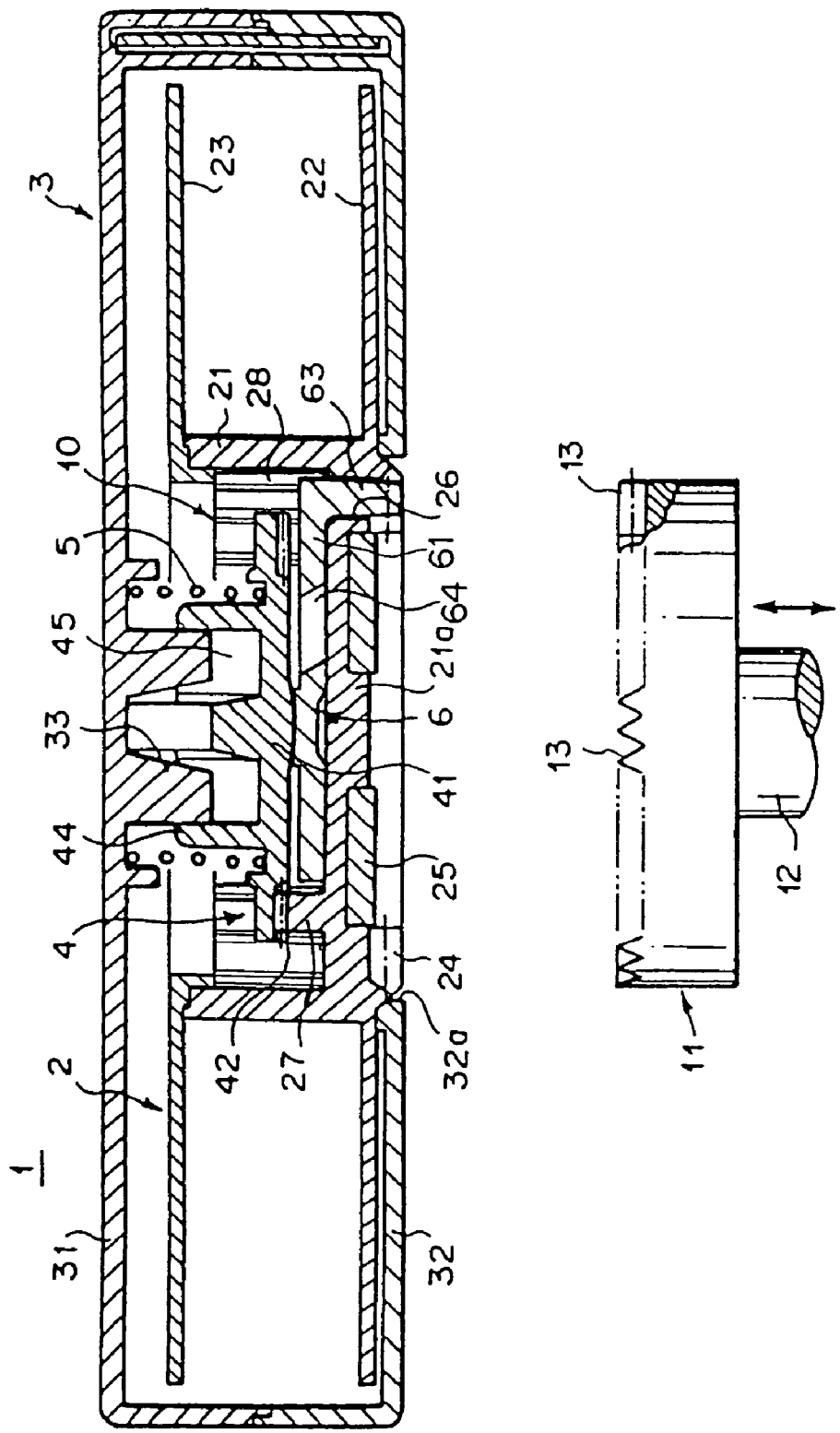
FIG. 1 is a sectional front view of a magnetic tape cartridge according to a first embodiment of the present invention, the tape cartridge being in an inoperative state.
Figure 2:
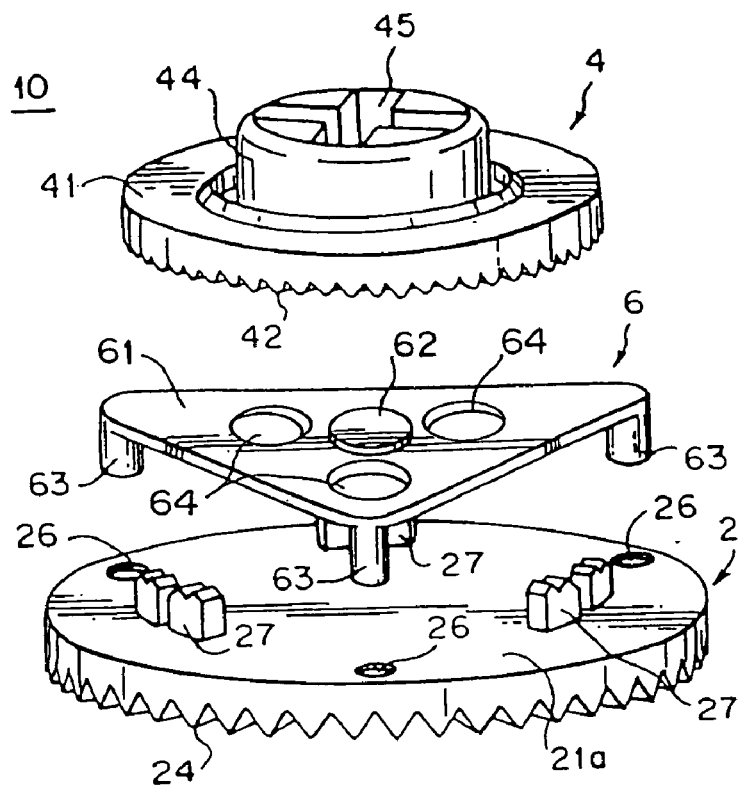
FIG. 2 is an exploded perspective view of the essential parts of the magnetic tape cartridge shown in FIG. 1.
Figure 3:
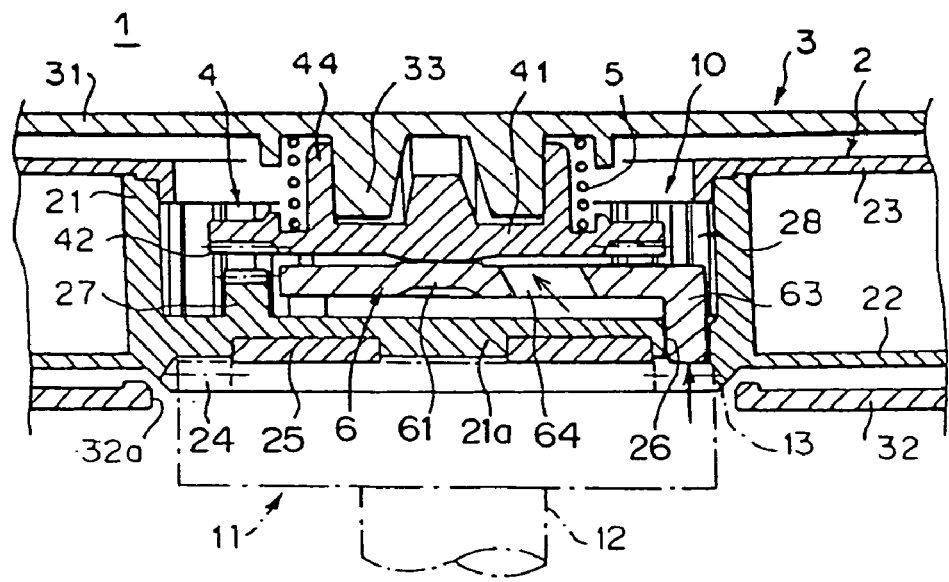
FIG. 3 is a sectional view of the magnetic tape cartridge of FIG. 1 being in an operative state.
Figure 4:
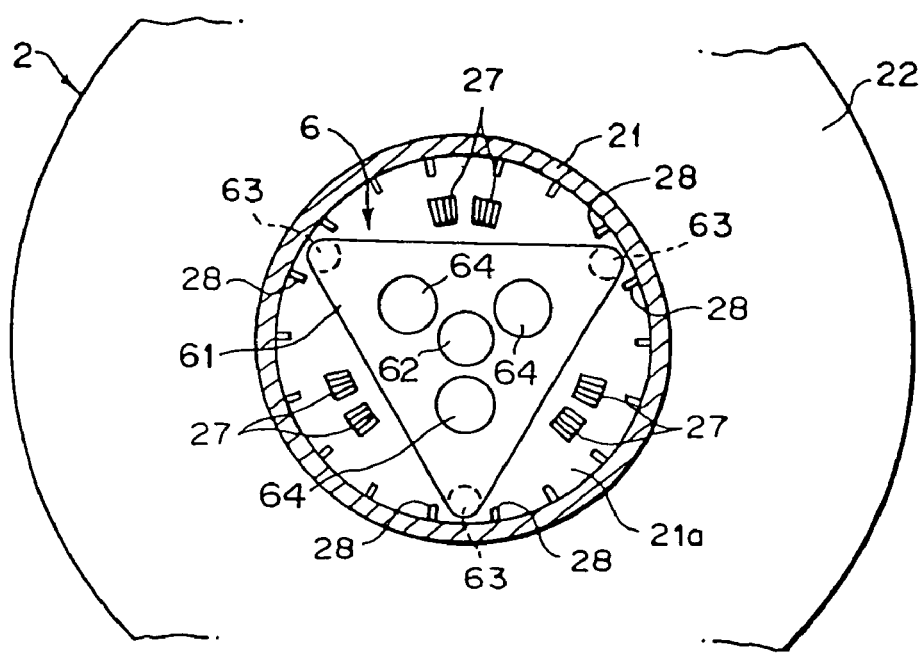
FIG. 4 is a plan view of the releasing member shown in FIG. 3.

The present invention will hereinafter be described in detail with reference to embodiments shown in the drawings. FIG. 1 shows a sectional view of a magnetic tape cartridge constructed according to a first embodiment of the present invention achieving the aforementioned first object of the invention, the tape cartridge being in an inoperative state. FIG. 2 shows an exploded perspective view of the essential parts of the magnetic tape cartridge of FIG. 1; FIG. 3 shows a sectional view of the essential parts of the magnetic tape cartridge of FIG. 1 being in an operative state; and FIG. 4 shows a plan view of an releasing member being in an assembled state.

The magnetic tape cartridge 1 is constructed so that a single reel 2 with magnetic tape (not shown) wound thereon is rotatably housed within a cartridge case 3. The cartridge case 3 is formed by fastening an upper case 31 and a lower case 32 which has a center opening 32a, with small screws, etc. The magnetic tape cartridge 1 is equipped with reel-rotation restraining means 10 which allows rotation of the reel 2 during use and restricts said rotation during periods of nonuse.

The reel 2 comprises a bottomed cylindrical reel hub 21 on which magnetic tape is wound on the outer periphery thereof, and a lower flange portion 22 and an upper flange portion 23 extending radially in disc form from the upper and lower ends of the reel hub 21. The reel hub 21 and the lower flange portion 22 are integrally formed from synthetic resin and are joined to the upper flange portion 23, for example, by ultrasonic welding.

When the upper flange portion 23 and the reel hub 21 are welded together, the inner periphery of the upper end portion of the reel hub 21 and the radially inner end periphery of the upper flange portion 23 are welded together. At the same time, a protrusion formed in the radially inner end periphery of the upper flange portion 23 is mated with a recess formed in the inner periphery of the upper end portion of the reel hub 21, and the bottom end of the radially inner end portion of the upper flange portion 23 is welded with the top ends of vertical ribs 28 disposed on the inner periphery of the reel hub 21.

The lower end portion of the reel hub 21 is formed integrally with a bottom wall 21a. The radially outer portion of the bottom surface of the bottom wall 21a has a reel gear 24 for rotating the reel 2, and the radially inner portion inside the reel gear 24 has an annular metal reel plate 25 for magnetic attraction. The reel gear 24 and the reel plate 25 of the reel 2 are disposed to face an opening 32a formed in the bottom surface of the cartridge case 3. Note that the reel 2 is urged downward by an urging member 5 described later.

Rotation means 11 provided on the side of a drive unit is equipped with a rotating shaft 12, and a driving gear 13 and a magnet (not shown) mounted on the rotating shaft 12. In the chucking operation of the rotation means 11, the magnetic tape cartridge 1 loaded into the bucket (not shown) of the drive unit is lowered with respect to the rotating shaft 12; the driving gear 13 meshes with the lowered reel gear 24; and the magnet of the rotation means 11 attracts the metal reel plate 25 of the reel hub 21, thereby maintaining the meshed state between the driving gear 13 and the reel gear 24.

Next, a description will be given of the mechanism of the reel-rotation restraining means 10. The reel-rotation restraining means 10 has a reel locking member 4 vertically movable toward and away from the reel 2, an urging member 5 for urging the reel locking member 4 in a restraining direction, and an releasing member 6 for moving the reel locking member in an unlocking direction.

The bottom wall 21a of the reel 2 is provided with 3 (three) through holes 26 vertically penetrating the reel gear 24 and disposed at equal intervals along a circle. The top surface of the bottom wall 21a is provided with three pairs of stopper protrusions (i.e., six stopper protrusions) 27 disposed at equal intervals along a circle at positions differing in phase from the three through holes 26. The upper end of each stopper protrusions 27 is formed into the shape of gear teeth. Note that more than three through holes 26 and more than 3 pairs of stopper protrusions 27 may be disposed. Also, the upper end of the stopper protrusion 27 may be formed into the shape of a single gear tooth. In the reel 2 shown in FIG. 2, only the part of the bottom wall 21a cut away from the reel 2 is shown.

The reel locking member 4 has a disc portion 41, which is disposed within the reel hub 21 of the reel 2 so that it faces the bottom wall 21a. The radially outer portion of the bottom surface of the disc portion 41 has an annular restraining gear 42 that is meshable with the upper ends of the three stopper protrusions 27. In addition, the center portion of the bottom surface of the disc portion 41 is projected into a convex shape and contacts the sliding portion 62 of the top surface of the releasing member 6.

Furthermore, the top surface of the disc portion 41 of the reel locking member 4 is provided with a protruding portion 44 that extends upward therefrom. The protruding portion 44 is provided with a stopper groove 45 in the form of a cross, the groove 45 extending in the vertical direction. Meanwhile, the inside surface of the upper case 31 of the cartridge case 3 is provided with a swivel stopping protrusion 33 that is inserted into the stopper groove 45 of the reel locking member 4. The reel locking member 4 is disposed so as to be movable in the vertical direction without rotating, with the stopper groove 45 engaged by the swivel stopping protrusion 33. Note that the stopper groove 45 may be provided in the form of a straight line.

Between the top surface, outside the protruding portion 44, of the disc portion 41 of the reel locking member 4 and the inside surface, outside the swivel stopping protrusion 33, of the upper case 31, the urging member (e.g., a coil spring) 5 is compressed so that the reel locking member 4 is urged downward in the restraining direction where the restraining gear 42 and the stopper protrusion 27 engage with each other.

In addition, the releasing member 6 is interposed between the reel locking member 4 and the bottom wall 21a of the reel hub 21 so that it is movable vertically. The bottom surface near the vertices of the generally triangular plate portion 61 of the releasing member 6 is provided with cylindrical leg portions 63 extending in the vertical direction. The triangular plate portion 61 and the leg portions 63 are integrally formed from high-rigidity resin material. The central portion of the top surface of the triangular plate portion 61 is formed into a sliding portion 62, which makes contact with the central portion of the bottom surface of the reel locking member 4.

The leg portions 63 of the releasing member 6 are inserted into the through holes 26 formed in the bottom wall 21a of the reel 2 so that they are movable into and out of the through holes 26, respectively. The lower ends of the leg portions 63 are positioned to face the tooth portion of the reel gear 24 of the bottom surface of the reel 2. Each stopper protrusion pair 27 is positioned between the leg portions 63 and outside the triangular plate portion 61. Each side of the triangular plate portion 61 is formed by a tangential line joining the outer peripheries of the circular leg portions 63 positioned at the vertices, and the outer periphery of each vertex is provided so that it becomes small.

Note that the vertical ribs 28 formed in the inner periphery of the reel 2 are formed on both sides of the through hole 26 at predetermined intervals. The vertical ribs 28 are used to position and guide the leg portions 63 of the releasing member 6 when the leg portions 63 are inserted into the through holes 26 (see FIGS. 4 and 6).

Figure 5:
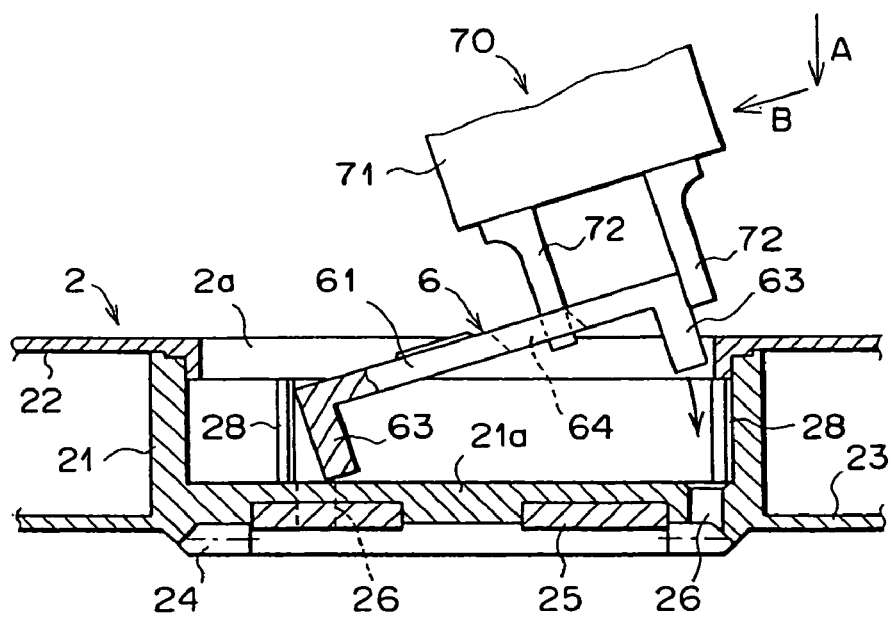
FIG. 5 is a sectional view showing how the releasing member is assembled into the reel by one method.

The triangular plate portion 61 of the releasing member 6 is further provided with three holding bores (circular holding portions) 64 into which an assembling tool 70 is inserted. For example, the releasing member 6 is held and positioned by the chuck (pair of jaws) 72 of the robot hand 71 of an assembling robot, as shown in FIG. 5. The three holding bores 64 are formed at positions facing the three vertexes of the triangular plate portion 61 of the releasing member 6, and a real so formed obliquely toward the sliding portion 62 which contacts the reel locking member 4, that is, toward the center of the triangular plate portion 61. As shown by an arrow in FIG. 3, the holding bores 64 acts as a fan that forms a flow of air from the bottom surface of the triangular plate portion 61 toward the sliding portion 62 and perform cooling of the sliding portion 62.

Note that in the case where the holding bores 64 are formed solely for the purpose of being held by the assembling tool 70, the triangular plate portion 61 of the releasing member 6 may have recesses instead of the holding bores 64.

Figure 6:
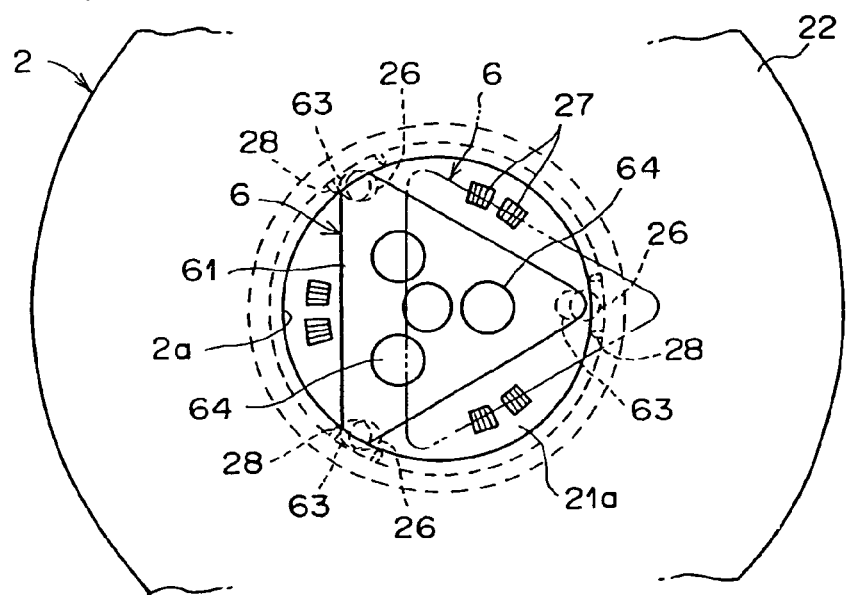
FIG. 6 is a plan view of the releasing member assembled into the reel.

When the releasing member 6 is assembled into the reel 2, as shown in FIGS. 5 and 6, one of the leg portions 63 and the holding bore 64 are clamped by the chuck 72 of the assembling tool 70 so that the releasing member 6 is held in an inclined state where the remaining two leg portions 63 are positioned lower than the one leg portion 63. Then, as shown by a two-dotted line in FIG. 6, the lowered side of the triangular plate portion 61 is moved and inserted downward as shown by an arrow A in FIG. 5, at a position near the central portion of the center opening 2a of the reel 2. Thereafter, the triangular plate portion 61 is moved forward as shown by an arrow B, and as shown by a solid line in FIG. 6, the two front leg portions 63 are brought into contact with the vertical ribs 28 near the through holes 26 and are stopped in a positioned state. Subsequently, if the chuck 72 of the assembling tool 70 are opened, the held state of the releasing member 6 is released and the rear leg portion 63 being held is dropped by its dead weight. As a result, the releasing member 6 is inserted within the center opening 2a of the reel 2, and the leg portions 63 of the releasing member 6 are automatically inserted into the through holes 26. The dimensions of the releasing member 6 are set so that such an assembly operation can be performed.

Figure 7A:
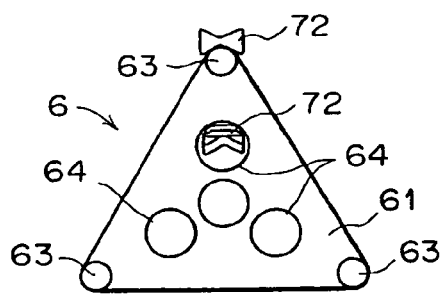
FIG. 7A is a bottom view showing the releasing member.
Figure 7B:
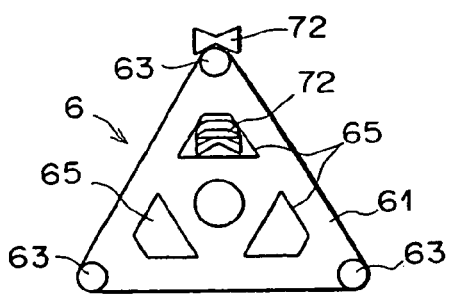
FIG. 7B is a bottom view of a first modification of the releasing member.
Figure 7C:
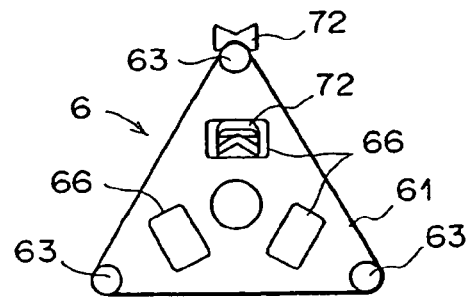
FIG. 7C is a bottom view of a second modification of the releasing member.

As shown in FIG. 7A, the holding bore 64 of the releasing member 6 in the first embodiment is circular in shape so that the releasing member 6 can be clamped between the holding bore 64 and one of the vertexes of the triangular plate portion 61 by the chuck 72. However, the circular holding bore 64 may be formed into a trapezoidal holding bore (trapezoidal holding portion) 65, as shown in FIG. 7B. Also, it may be formed into a rectangular holding bore (rectangular holding portion) 66, as shown in FIG. 7C.

Figure 8:
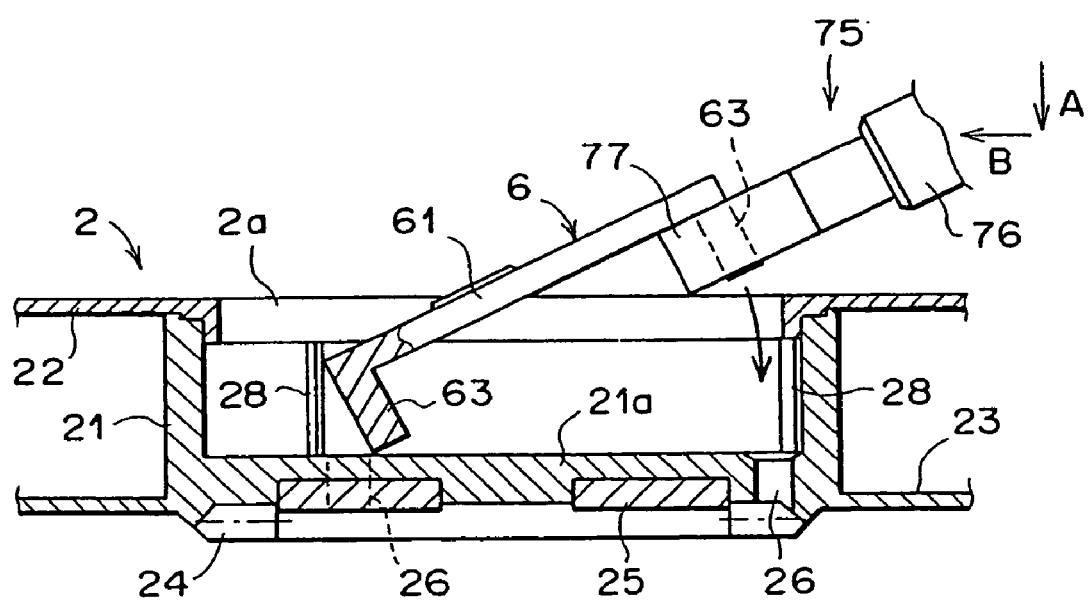
FIG. 8 is a sectional view showing how the releasing member is assembled into the reel by another method.

FIG. 8 illustrates how the releasing member 6 is assembled into the reel 2 by another method. In this example, one of the leg portions 63 of the releasing member 6 is held by the chuck 77 of the handle 76 of an assembling tool 75 (of an assembling robot). In this case, the releasing member 6 can be assembled into the reel 2 in the same assembly operation as the aforementioned, even when the triangular plate portion 61 of the releasing member 6 does not have the aforementioned holding bores 64.

Furthermore, although not shown, the surface, near one of the leg portions 63, of the triangular plate portion 61 of the releasing member 6 may be held by a suction tool. As with the aforementioned case, the releasing member 6 can be assembled into the reel 2.

Now, operation of the reel-rotation restraining means 10 will be described. The magnetic tape cartridge 1 in FIG. 1 is in an inoperative state such as an archived state, etc., and in this state, the reel locking member 4, the releasing member 6, and the reel 2 are moved to the side of the lower case 32 of the cartridge case 3 by the urging force of the urging member 5, and the center opening 32a of the lower case 32 is closed by the reel 2. The releasing member 6 is situated at the lowermost position where the bottom surface of the releasing member 6 abuts the top surface of the bottom wall 21a of the reel hub 21. The lower ends of the leg portions 63 of the releasing member 6 are aligned with the position of the tooth edge of the reel gear 24. The reel locking member 4 abutting the top surface of the releasing member 6 is also situated at the lowermost position where the upper ends of the stopper protrusion pairs 27 of the reel 2 engage with the restraining gear 42 of the reel locking member 4. In this state, rotation of the reel 2 is restricted and pulling-out of the magnetic tape is prevented.

On the other hand, when the magnetic tape cartridge 10 of FIG. 3 is loaded into the drive unit of a recording-reproducing unit and is in an operative state, the rotating shaft 12 of the rotation means 11 of the drive unit is moved toward the bottom surface of the reel 2. If the driving gear 13 of the drive unit meshes with reel gear 24 of the reel 2 and moves the reel 2 slightly upward, the tooth edge of the driving gear 13 abuts the lower ends of the leg portions 63 of the releasing member 6 and pushes them up. This causes the releasing member 6 to move upward against the urging force of the urging member 5 and also causes the reel locking member 4 to move upward in the unlocking direction. This movement unlocks the engagement between the restraining gear 42 of the reel locking member 4 and the stopper protrusions 27 of the reel 2. As a result, the reel 2 can rotate, and the magnetic tape is pulled out or rewound by the drive unit of the recording-reproducing unit. Note that the leg portion 63 of the releasing member 6 may be formed into the shape of a square pillar, an elliptical cylinder, etc.

Figure 9:
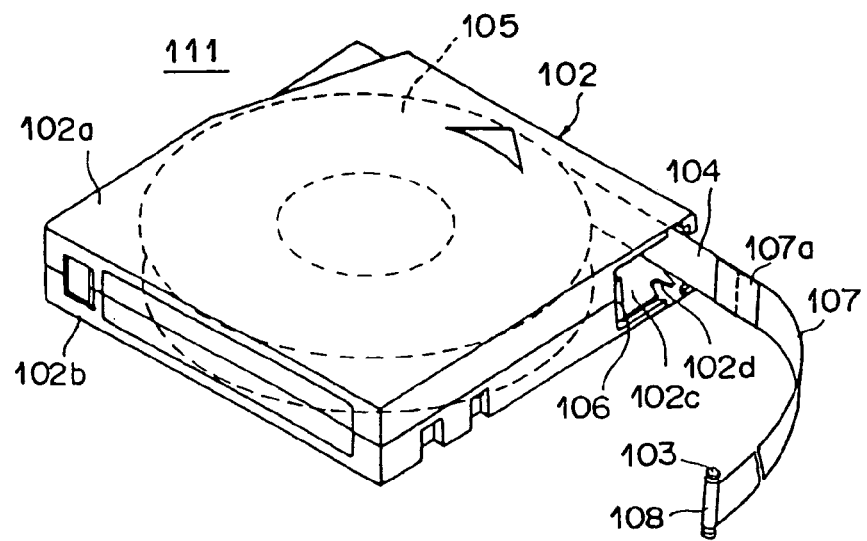
FIG. 9 is a perspective view of a magnetic tape cartridge of a second embodiment of the present invention, the magnetic tape being pulled out.
Figure 10:
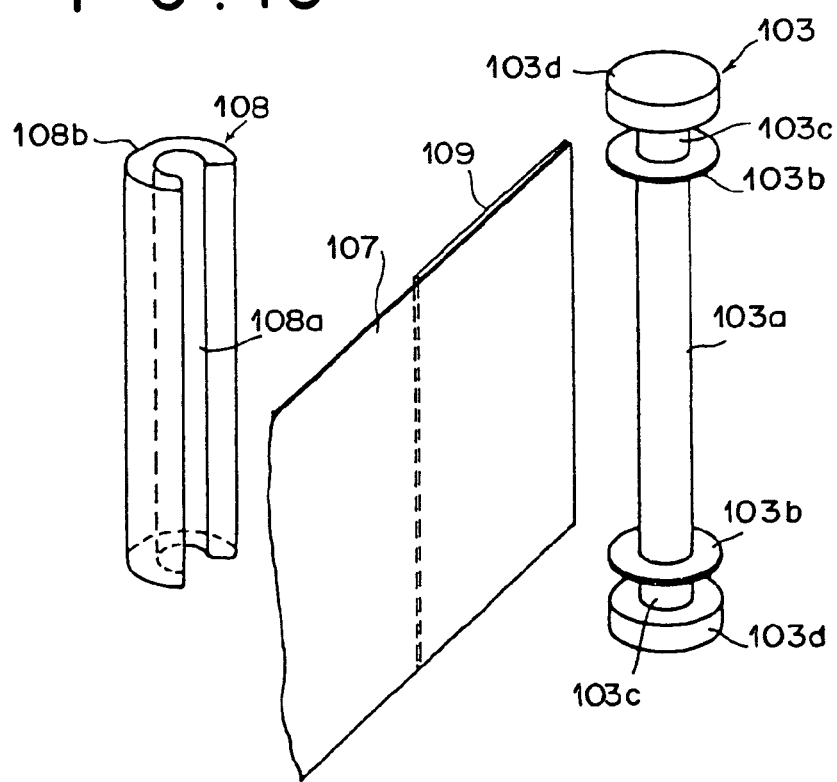
FIG. 10 is an exploded perspective view of parts by which the leading end of magnetic tape is firmly attached.
Figure 11:
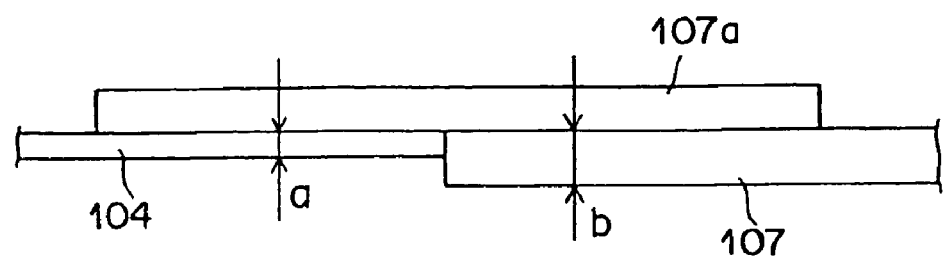
FIG. 11 is a plan view of the joint portion between magnetic tape and leader tape.
Figure 12:
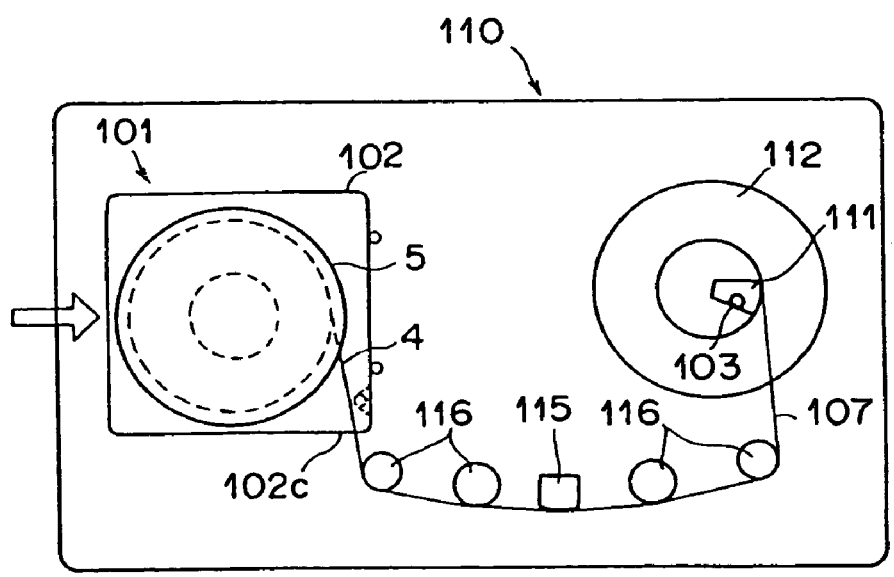
FIG. 12 is a schematic diagram of the state in which the magnetic tape cartridge has been loaded into a magnetic recording-reproducing unit.

FIG. 9 shows a perspective view of a magnetic tape cartridge of a second embodiment of the present invention achieving the aforementioned second object of the invention, with the magnetic tape pulled out. FIG. 10 shows an exploded perspective view of parts by which the leader pin is firmly attached, FIG. 11 shows a plan view of the joint portion between magnetic tape and leader tape, and FIG. 12 shows a schematic diagram of the state in which the magnetic tape cartridge has been loaded into a magnetic recording-reproducing unit. Note that the second embodiment uses a leader pin as a leader member.

The magnetic tape cartridge 101 has a cartridge case 102, which is formed by fastening an upper case 102a and a lower case 102b together with small screws, etc. Within the cartridge case 102, a single reel 105 with magnetic tape 107 wound thereon is rotatably housed. The leading end of the magnetic tape 104 is joined to leader tape 107 firmly attached to a leader pin (leader member) 103. One side wall of the cartridge case 102 has an opening 102c for pulling out the magnetic tape 104 from the cartridge case 102. Near the opening 102c, there is provided a slide door 106 that is urged in a closing direction by elastic means (not shown). In the state of FIG. 1, the slide door 106 is open. In the magnetic tape cartridge 101 in an inoperative state, the magnetic tape 104 and the leader tape 107 are completely wound on a reel 105, the leader pin 103 is held in leader-pin housing recesses 102d. The leader tape 107 can be formed in various forms as shown in embodiments to be described later.

Although not shown, the central portion of the lower case 102b has a center bore for rotating the reel 105 by the drive shaft of a magnetic recording-reproducing unit. The central portion of the reel 105 is provided with a rotation regulating mechanism or braking mechanism (not shown) for restricting rotation of the reel 105 when not being used. Besides, the central portion of the bottom surface of the reel 105 is provided with a reel plate (not shown) for attracting and holding magnet-type rotation means, and the outerperiphery of the bottom surface is provided with a reel gear (not shown) for meshing with the driving gear of the magnet-type rotation means. Note that when the reel gear of the reel 105 and the driving gear of the rotation means are meshed, the rotation regulating means is unlocked so that the reel 105 is freely rotatable.

The leader pin 103 is used for holding and pulling out the magnetic tape 104 so that the magnetic tape 104 is introduced into a tape running path provided within a magnetic recording-reproducing unit 110 (see FIG. 12) which uses the magnetic tape cartridge 101. This leader pin 103 is firmly attached by use of a C cross section clip 108 to the end of the leader tape 107 joined to the leading end of the magnetic tape 104.

The leader pin 103, as shown in FIG. 10, has a clamp shaft portion 103a at the central portion thereof, upper and lower flange portions 103b, 103b on upper and lower sides of the shaft portion 103a, and engagement portions 103c, 103c extending from the flange portions 103b, 103. The end portion of the leader tape 107 is clamped between the shaft portion 103a and the clip 108 by fitting the clip 108 onto the clamp portion 103a. The engagement portions 103c, 103c are engaged and held by the recording-reproducing unit. The leader pin 103 further has locking portions 103d, 103d on both ends thereof, and the locking portions 103d are held in the leader-pin housing recesses (not shown) formed near the opening 102c. The clip 108 is molded from resin and has an axial length equivalent to the length of the clamp portion 103a of the leader pin 103. The clip 108 is provided with an axial slit 108a extending over the overall length thereof and is formed into a C cross section shape. The clip 108 is also provided with a flat portion 108b at the outer periphery opposite to the slit 108a.

The leader tape 107 is joined to the leading end of the magnetic tape 104 by a known splicing tape 107a, with the leading end of the magnetic tape 105 contacted with one end of the leader tape 107 (see FIG. 11). The other end of the leader tape 107 that is firmly attached to the leader pin 103 may have reinforcement tape 109 stuck thereon, as shown in FIG. 10.

The reinforcement tape 109 is interposed between the clip 108 and the clamp portion 103a so that sufficient clamping force is assured between them. This reinforcement tape 109 has an adhesive property and is stuck on one side of the leader tape 107. The reinforcement tape 109 uses a flexible ribbon-like member, which has an adhesive layer on one side thereof, such as plastic sheet, form sheet, laminate film, laminate paper, etc.

A first embodiment of the leader tape 107 is constructed so that the specific surface resistance thereof is $1 \times 10^{13}$ $\Omega/2.54$ cm$^2$ or less, preferably $1 \times 10^{12}$ $\Omega/2.54$ cm$^2$ or less, and further preferably $1 \times 10^{11}$ $\Omega/2.54$ cm$^2$ or less. The first embodiment of the leader tape 107 employs, for example, magnetic tape with a magnetic layer on at least one side, metal tape formed from a metal sheet, aluminized tape, conductive resin tape, etc.

Such a leader tape having conductivity at a value smaller in specific surface resistance than ordinary plastic material is used so that a high-sensitive magnetic head such as an MR head, etc., is not damaged by an accumulated static electricity charge.

A second embodiment of the leader tape 107 is constructed so that the base film of the leader tape 107 has a lengthwise elastic modulus of 630 kg/mm$^2$ or less and a widthwise elastic modulus of 580 kg/mm$^2$ or less, preferably a lengthwise elastic modulus of 550 kg/mm$^2$ or less and a widthwise elastic modulus of 550 kg/mm$^2$ or less. For instance, polyethylene terephthalate (PET) film and polyimide (PI) film are suitable for the base material of the leader tape 107. If a base material whose elastic modulus (Young's modulus) is relatively low is used, the tear strength for the leader tape 107 becomes higher. Even if it is repeatedly used, there will be no damage and excellent reliability will be obtained. A base material whose elastic modulus is high is liable to tear by contact with an edge portion.

A third embodiment of the leader tape 107 is constructed so that the thickness of the leader tape 107 is less than or equal to 5 times that of the magnetic tape 104. That is, as shown in FIG. 11, at the part where the magnetic tape 104 and the leader tape 107 are joined together by the splicing tape 107a, the thickness b of the leader tape 107 is greater than the thickness a of the magnetic tape 104. The dimensions of the magnetic tape 104 and the leader tape 107 are set so that a ratio (b/a) between them is 5 times or less ($\leq 5$), preferably 3 times or less, and further preferably 2 times or less.

If the thickness ratio between the magnetic tape 104 and the leader tape 107 is made relatively small, the stepped portion in the joint portion between them can be made smaller; the tape transfer onto the stepped portion due to deformation caused by winding of the magnetic tape 104 can be reduced; a tape end region, which has a possibility of dropout and in which no magnetic recording is performed, can be made shorter; reliability of magnetic recording quality can be enhanced; and recording capacity can be increased. Note that no data is written to a region where tape transfer occurs.

A fourth embodiment of the leader tape 107 is constructed so that at least the leading end portion of the leader tape 107 to which the leader pin 103 is firmly attached has a center-line average surface roughness Ra of 4 nm or greater, preferably 8 nm or greater, and further preferably 12 nm or greater. Note that in the case where the leader tape 107 has a magnetic layer like the first embodiment, it will be sufficient if at least either the top surface or bottom surface of the magnetic layer has the aforementioned center-line average surface roughness Ra.

If the surface roughness of the leader tape 107 is increased to make the friction coefficient higher, the clamping force between the leader tape 107 and the leader pin 103 can be made greater; fixed attachment can be satisfactorily performed; and load and unload operations can be reliably performed without disengagement of the leader pin 103 from the leader tape 107. In addition, if the aforementioned reinforcement tape 109 is stuck on the leading end portion of the leader tape 107, the clamping force can be made even greater and the resistance to bending strength can also be enhanced. Furthermore, if the surface roughness of the leader tape 107 is made greater, it has the effect of removing magnetic power adhering to the surface of a magnetic head 115 when the leader tape 107 runs along the magnetic head surface.

Note that the leader tape 107 which is actually used is constructed by combining the first through fourth embodiments. For instance, PET film is used as the base material of the leader tape 107; one surface of the leader tape 107 has a magnetic layer; the surface roughness of the magnetic layer is 4 nm or greater; the thickness is about twice that of the magnetic tape 104; and the leading end portion of the leader tape 107 has the reinforcement tape 109 stuck thereon.

The magnetic tape cartridge 101 is loaded, for example, into a magnetic recording-reproducing unit 110 such as that shown in FIG. 12. As the magnetic tape cartridge 101 is loaded into the magnetic recording-reproducing unit 110, the slide door 106 is operated and opening 102c is opened. Then, a leader block 111 installed within the unit 110 moves and enters the cartridge case 102 through the opening 102c. Next, the leader block 111 engages and holds the leader pin 103. Thereafter, the leader block 111 moves along a tape running path, while pulling out the leader tape 107 along with the magnetic tape 104. In this manner, the leader pin 103 is fitted onto the hub of a machine reel 112 installed within the magnetic recording-reproducing unit 110.

The magnetic head 115 of the magnetic recording-reproducing unit 110 is disposed near the tape running path, and a plurality of tape guides 116 are disposed-on both sides of the magnetic head 115. The magnetic tape 104 is moved with respect to the magnetic head 115 by rotation of the machine reel 112, whereby magnetic recording or magnetic reproduction is performed.

It is desirable that the leader tape 107 have a length greater than or equal to the sum total of the length of the running path from the opening 102c of the cartridge case 102 to the machine reel 112, and the length of the leader tape 107 wound at least three times on the machine reel 112.

In the aforementioned embodiment, the leader pin (leader member) 103 is firmly attached to the leading end portion of the leader tape 107. However, the leader block may be firmly attached directly to the leading end portion of the leader tape 107. In addition, various types of leader members may be employed, as long as they are constructed so that the leader tape 107 is pulled out by a holding member provided in the magnetic recording-reproducing unit. Furthermore, in the aforementioned embodiments, the reinforcement tape 109 is stuck on the leading end portion of the leader tape 107. However, in the case where sufficient strength and clamping force are obtained by the leader tape 107 itself, sticking of the reinforcement tape 109 onto the leader tape 107 becomes unnecessary. The clip 108 is not limited to resin molded products. It may be formed from a plurality of members or various materials. For example, it may be formed from a thin metal plate. Also, a member, such as an elastomer, etc., for protecting tape or obtaining friction force, may be interposed between a thin metal clip and tape.

The invention claimed is:

1. A magnetic tape cartridge comprising:
   a single reel with magnetic tape wound thereon;
   a cartridge case in which said reel is rotatably housed, said reel including through holes and one or more vertical ribs; and
   reel-rotation restraining means which allows rotation of said reel during use and restricts said rotation during periods of nonuse;
   wherein said reel-rotation restraining means comprises:
   a reel locking member, which is movable toward and away from said reel, for restricting rotation of said reel,
   an urging member for urging said reel locking member in a restraining direction, and
   a releasing member, which is rotatable integrally with said reel, for moving said reel locking member in an unlocking direction by moving according to a chucking operation of rotation means provided in a drive unit;
   and wherein said releasing member comprises:
   a generally triangular plate portion, and
   three leg portions, provided on vertexes of said triangular plate portion, at least one of the three leg portions abutting against at least one of the vertical ribs acting as an alignment guide, and each leg portion having a lower end which is inserted into one of the through holes provided in said reel and abuts part of the rotation means of said drive unit;
   and wherein a size of a center opening of the reel is smaller than that of a portion of the cartridge case in which the releasing member is housed.

2. The magnetic tape cartridge as defined in claim 1, wherein the triangular plate portion of said releasing member has a holding portion so that it can be positioned and held by an assembling tool.

3. The magnetic tape cartridge as defined in claim 2, wherein said holding portion is constructed of a bore penetrating the plate portion of said releasing member, said bore being formed obliquely toward a sliding portion of said releasing member that contacts said retraining member.

4. The magnetic tape cartridge as defined in claim 1, further comprising:
- leader tape firmly attached at one end thereof to a leading end of said magnetic tape;
- a leader member, firmly attached to the other end of said leader tape, for pulling out said magnetic tape to a magnetic recording-reproducing unit; and
- reinforcement tape stuck near an end of said leader tape to which said leader member is firmly attached;
- wherein at least one side of said leader tape has a center-line average surface roughness (Ra) of 4 nm or greater.

5. The magnetic tape cartridge as defined in claim 4, wherein said leader tape has a base material having a lengthwise elastic modulus of 630 kg/mm$^2$ or less and a widthwise elastic modulus of 580 kg/mm$^2$ or less, preferably a lengthwise elastic modulus of 550 kg/mm$^2$ or less and a widthwise elastic modulus of 550 kg/mm$^2$ or less.

6. The magnetic tape cartridge as defined in claim 4, wherein the base material of said leader tape is formed from polyethylene terephthalate (PET) film or polyimide (PI) film.

7. The magnetic tape cartridge as defined in claim 4, wherein a thickness of said leader tape is less than or equal to five times a thickness of said magnetic tape, preferably less than or equal to three times, and further preferably less than or equal to two times.

8. The magnetic tape cartridge as defined in claim 4, wherein said leader tape has a length greater than or equal to the sum total of a length of a tape running path leading from an opening formed in said cartridge case to a machine reel in said magnetic recording-reproducing unit, and a length of said leader tape wound at least three times the reel hub circumference on said machine reel.

* * * * *